United States Patent [19]

Sargeant et al.

[11] Patent Number: 5,121,022
[45] Date of Patent: Jun. 9, 1992

[54] ROTOR CORE STRUCTURE FOR AN ELECTROMAGNETIC ROTATING MACHINE

[75] Inventors: John B. Sargeant; Lorenzo Ramirez; Robert T. Hagaman, all of Oviedo, Fla.

[73] Assignee: Westinghouse Electric Corp., Pittsburgh, Pa.

[21] Appl. No.: 574,021

[22] Filed: Aug. 29, 1990

[51] Int. Cl.$^5$ ............................................. H02K 1/06
[52] U.S. Cl. .................................... 310/217; 310/216; 310/258
[58] Field of Search ............... 310/216, 217, 258, 261, 310/259, 85, 89, 91

[56] References Cited

U.S. PATENT DOCUMENTS 3,940,648  2/1976  Wielt et al. .......................... 310/217
4,406,960  9/1983  Gillet et al. .......................... 310/217

FOREIGN PATENT DOCUMENTS 193477  11/1957  Austria ................................ 310/217
406396  1/1966  Sweden ............................... 310/217

Primary Examiner—Steven L. Stephan
Assistant Examiner—Matthew Nguyen

[57] ABSTRACT

A rotor for an electromagnetic energy conversion device, which rotor includes a core composed of a stack of thin plates, is clamped between two end plates by means of a plurality of end clamping fingers. Each clamping finger is initially mounted on a respective end plate and is then pressed against the core by a clamping force applied via the end plates.

6 Claims, 2 Drawing Sheets

5,121,022

ROTOR CORE STRUCTURE FOR AN ELECTROMAGNETIC ROTATING MACHINE

BACKGROUND OF THE INVENTION

The present invention relates to electromagnetic rotating machines, and the construction of the rotor of such a machine.

The rotors of many electromagnetic rotating machines frequently include a core composed of a plurality of this, stamped plates, or lamina, which lie in planes perpendicular to the axis of rotation of the rotor and are clamped together to form the rotor core.

In many such machines, typically including generator exciters, the stack of rotor plates is clamped between two end plates through the intermediary of end fingers which are disposed at each axial end of the core.

Heretofore, it has been the practice in the art to secure the end fingers to the outermost plates of the core and to provide each end finger with positioning elements via which the end finger is properly positioned with respect to an associated end plate.

Two examples of such known arrangements are shown in FIG. 1, which is a perspective detail view illustrating a portion of one rotor plate 4, provided with rotor teeth 6. The plate 4 shown in FIG. 1 is the outermost plate of a stack of such plates which form a core.

Two different types of end fingers are illustrated in FIG. 1, these including a first end finger 8 which may be made of stainless steel and which will be spot-welded to plate 4 at points 10, and a second end finger 12 which may be made of aluminum and is provided with projections 14 extending through openings 16 in plate 4. After end finger 12 is positioned on plate 4 of the free end of each projection 14 is deformed, as by hammering to, in effect, rivet each end finger 12 to plate 4.

As is further apparent from FIG. 1, each type of end finger 8, 12 is provided with formations via which the end fingers may mate, in a defined position, with an associated end plate (not shown). It will be appreciated that in any given core, all of the end fingers will be of the same design.

Arrangements of the type described above and illustrated in Figure presents certain inherent drawbacks. Thus, for example, because the end fingers are secured to a relatively thin plate, or lamina, the size, and particularly the cross-section, of each end finger must be limited so as not to produce centrifugal forces which could break the weld joints or rivet connections.

Another drawback associated with both of the types of end fingers shown in FIG. 1 relates to the difficulty involved in accurately locating each end finger on the associated end plate of the core.

SUMMARY OF THE INVENTION

It is a primary object of the present invention to eliminate, or at least minimize, the difficulties described above.

Another object of the invention is to permit end fingers having larger cross-sections to be employed in such rotors.

Another object of the invention is to provide end fingers which will experience lower levels of stress during operation of a machine containing such a rotor.

The above and other objects are achieved, according to the invention, in a rotor for an electromagnetic energy conversion device, which rotor has an axis of rotation and comprises a rotor core composed of a stack of thin plates; two end plates each having a greater thickness than any one of the thin plates; and a plurality of end clamping fingers interposed between the core and each of the end plates and via which the core is clamped between the end plates, in that the fingers are carried by the end plates and are held against the core by a clamping face applied via the end plates.

DESCRIPTION OF THE PREFERRED EMBODIMENTS

Figure 1:
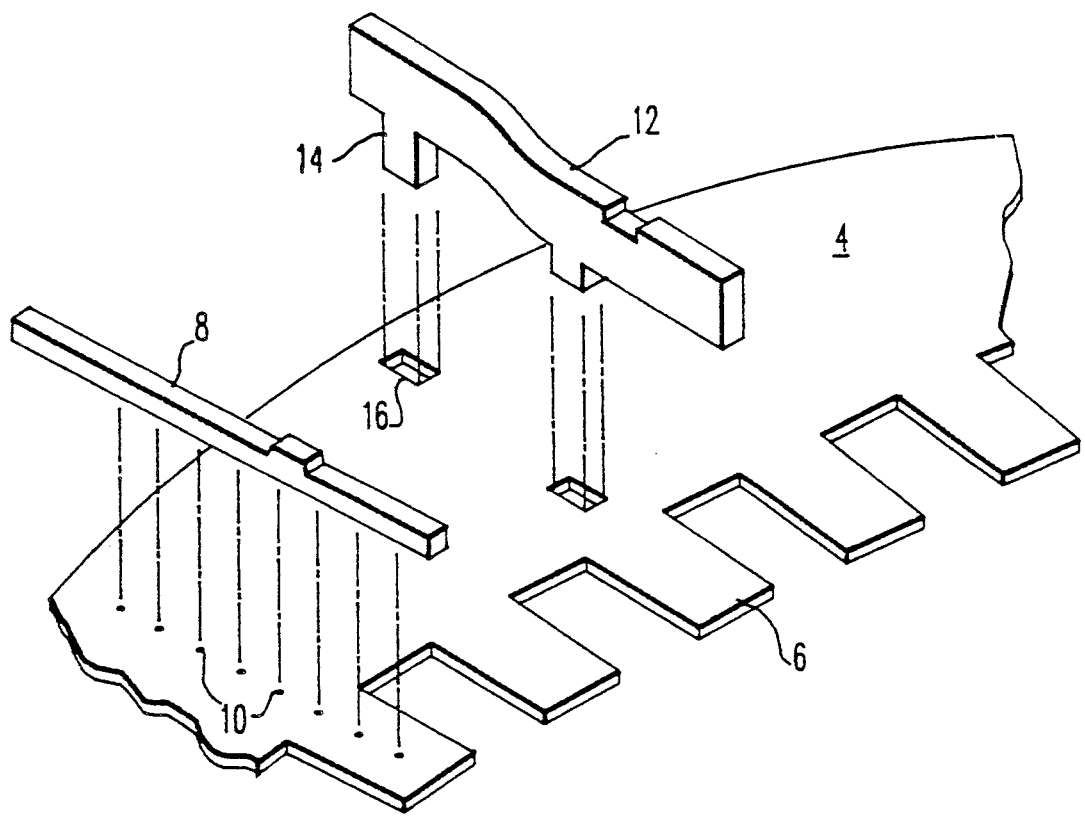
FIG. 1 is a perspective view illustrating various structures according to the prior art.
Figure 3:
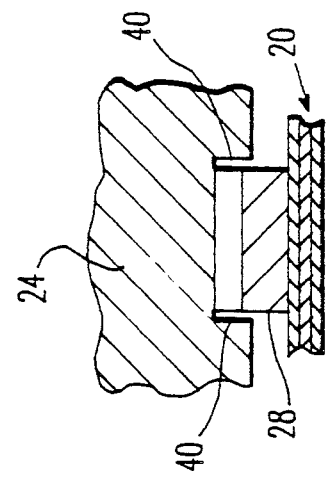
FIG. 3 is a cross-sectional view taken through line III—III of FIG. 2.
Figure 2:
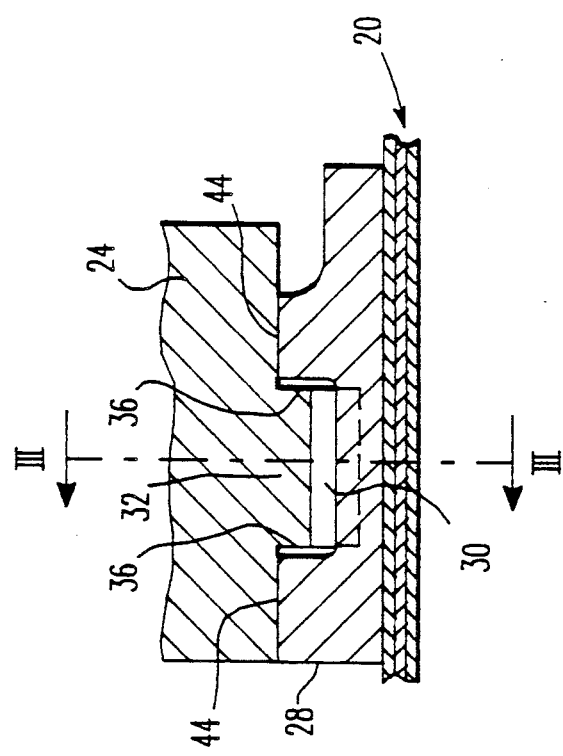
FIG. 2 is a cross-sectional view taken in a plane passing through the axis of a rotor and illustrating one embodiment of the present invention.

FIGS. 2 and 3 will be described together, since they are two views of the same structural portion. These Figures illustrate, firstly, a core 20 composed of a plurality of laminae each of which may have the form of plate 4 shown in FIG. 1, with openings 16 not being provided. Opposite each axial end face of core 20 there is disposed an end plate 24 which is relatively massive compared to each lamina of core 20. End plate 24 and an identical further end plate at the opposite end of core 20 are mounted in such a manner as to clamp the laminae of core 20 together in the axial direction.

For various reasons relating to the construction of such rotors, clamping is effected via the intermediary of a plurality of end fingers 28, each of which performs the function of a respective one of the fingers 8 and 12 of FIG. 1. However, as will be described below, end fingers 28 can be given a larger cross-section than end fingers according to the prior art.

In further accordance with the invention, end fingers 28 are initially retained by end plates 24 and are pressed against the outer axial surface of core 20 in order to clamp core 20 between end plates 24.

In order to accurately position each end finger 28 with respect to its associated end plate 24, each end finger 28 and end plate 24 are given appropriate mating configurations. Thus, in the particular embodiment illustrated in FIGS. 2 and 3, each end finger is provided with a recess 30, and each end plate 24, having the general form of a ring, is provided with a plurality of projections 32, with each projection 32 being associated with a respective end finger 28. Opposed surfaces 36 of each projection 32 contact corresponding surfaces of an associated recess 30 to effect radial positioning of each end finger 28. Correspondingly, the position of each end finger 28 in the direction of the circumference of the associated end plate 24 is defined by positioning surfaces 40 on end plate 24, these positioning surfaces cooperating with radially extending sides of each end finger 28. Precise circumferential positioning of each end finger 28 is not critical, so that surfaces 40 are located to allow a certain tolerance in the circumferential positioning of each end finger 28.

In addition, each end finger 28 has two bearing surfaces 44 which lie in a plane, or respective planes normal to the axis of rotation of the rotor. Surfaces 44 bear against mating surfaces of end plate 24 when finger 28 is assembled therewith.

As is apparent from FIGS. 2 and 3, end fingers 28 have flat surfaces via which they bear against core 20 in order to clamp core 20 in place.

Prior to assembly, each end finger 28 may be held on its associated end plate 24 by means of an adhesive which need not produce a high strength, or permanent bond. Once a rotor has been assembled, end fingers 28 will be permanently clamped between end plates 24 and core 20 by axial forces.

In typical installations according to the present invention, there may be one end finger 28 for each rotor tooth.

According to preferred embodiments of the invention, end fingers 28 are made of aluminum, which combines sufficient strength with light weight. The lighter weight of aluminum reduces the centrifugal forces produced by the end fingers. Alternatively, the end fingers could be made of steel.

To cite one non-limiting example of the use of the present invention, it could be employed in a generator exciter constructed to rotate at 3600 rpm and producing an output of 3000 to 5000 kW. Such an exciter could have a diameter of the order of 1 m and 75 cm. The rotor could be configured to have 30-50 teeth, and would be provided, at each end, with one end finger 28 for each tooth.

Thus, the present invention makes it possible to provide end fingers having a larger cross-section than those which could be provided in the prior art. This allows greater centrifugal loading to be applied to the rotor and provides a safer margin of clamping pressure on the rotor teeth. At the same time, the stresses created in those fingers are reduced. Because of the manner in which each end finger is associated with an end plate 28, each end finger can be positioned relative to the end plate with closer tolerances.

Obviously, elimination of the need to weld or rivet each finger to a rotor plate simplifies the manufacturing process.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a rotor for an electromagnetic energy conversion device, which rotor has an axis of rotation and comprises a rotor core composed of a stack of thin plates; two end plates each having a greater thickness than any one of said thin plates; and a plurality of end clamping fingers interposed between said core and each of said end plates and via which said core is clamped between said end plates, the improvement wherein said fingers are carried by said end plates and are held against said core by a clamping force applied via said end plates, said fingers being spaced apart from one another about the axis of said rotor, said end plates and said fingers are shaped to have cooperating positioning surfaces for retaining each said finger in a defined position relative to one of said end plates in a radial direction with respect to the axis of rotation of said rotor and in the circumferential direction about the axis of rotation of said rotor, each of said fingers has one face the entirety of which has a flat surface via which said finger bears against said core, and said fingers are held in position relative to said core solely by said clamping force.

2. A rotor as defined in claim 1 wherein said positioning surfaces include first positioning surfaces defining the position of each said finger relative to a respective end plate in a radial direction with respect to the axis of rotation of said rotor.

3. A rotor as defined in claim 2 wherein said positioning surfaces further include second positioning surfaces defining the position of each said finger relative to a respective end plate in the circumferential direction about the axis of rotation of said rotor.

4. A rotor as defined in claim 3 wherein said positioning surfaces further include third positioning surfaces defining the position of each said finger relative to a respective end plate in the axial direction of said rotor.

5. A rotor as defined in claim 4 wherein in each said finger is attached to one of said end plates.

6. A rotor as defined in claim 1 wherein each said finger is attached to one of said end plates.

* * * * *